(No Model.) 5 Sheets—Sheet 2.

F. BEAN.
SETTING MACHINE.

No. 528,524. Patented Nov. 6, 1894.

WITNESSES: INVENTOR:

(No Model.) 5 Sheets—Sheet 3.
F. BEAN.
SETTING MACHINE.
No. 528,524. Patented Nov. 6, 1894.
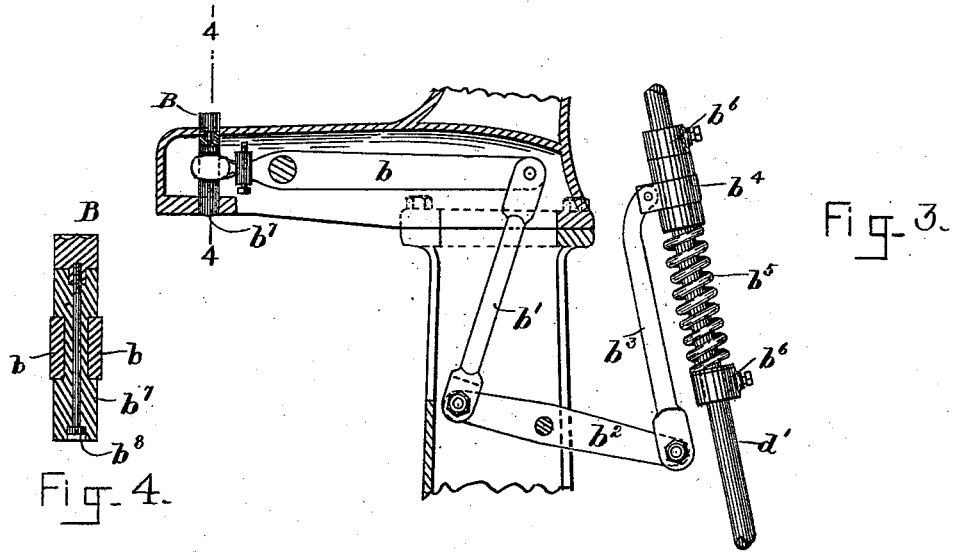
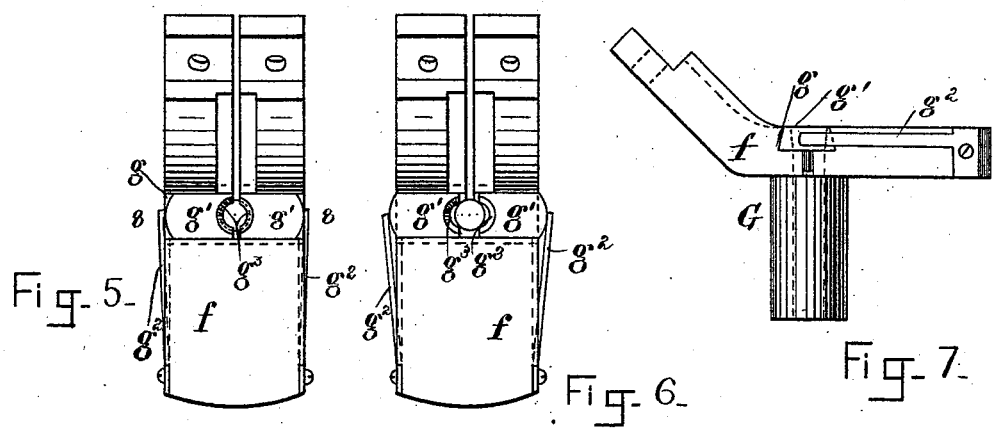
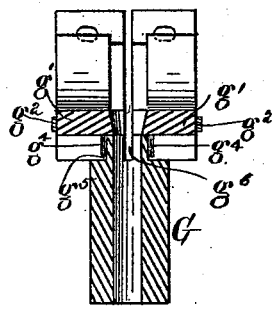
WITNESSES:
Lauritz W. Molen
John R. Snow
INVENTOR
Frank Bean
by his attys.
Wequashir & Bush (No Model.)  5 Sheets—Sheet 4.

F. BEAN.
SETTING MACHINE.

No. 528,524. Patented Nov. 6, 1894.

WITNESSES.  INVENTOR.
Frank Bean

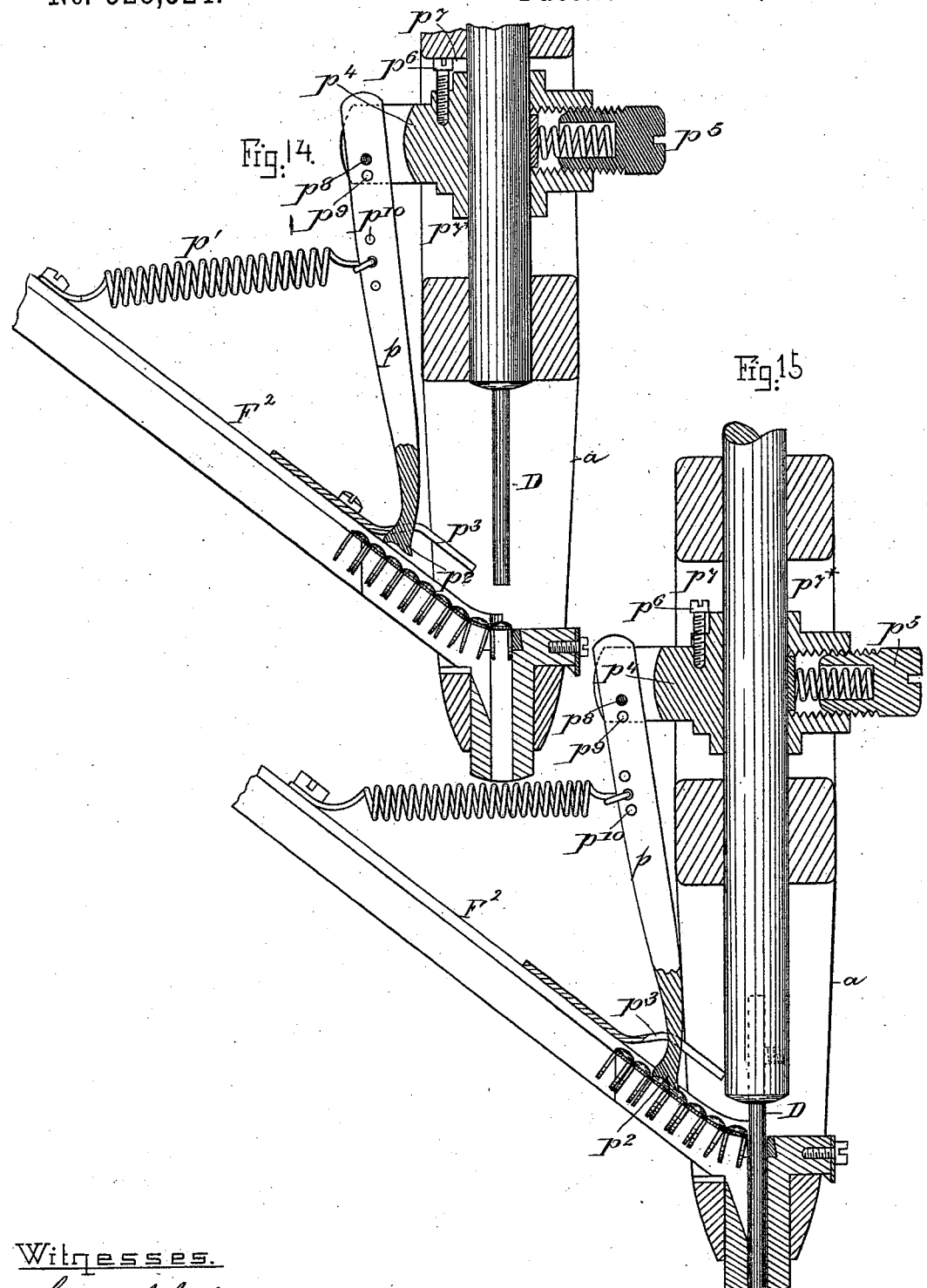

UNITED STATES PATENT OFFICE.

FRANK BEAN, OF MEDFORD, ASSIGNOR TO THE STANDARD RIVET COMPANY, OF BOSTON, MASSACHUSETTS.

SETTING-MACHINE.

SPECIFICATION forming part of Letters Patent No. 528,524, dated November 6, 1894.

Application filed April 16, 1890. Serial No. 348,257. (No model.)

*To all whom it may concern:*

Be it known that I, FRANK BEAN, of Medford, in the county of Middlesex and State of Massachusetts, have invented a new and useful Improvement in Setting-Machines, of which the following is a specification, reference being had to the accompanying drawings, in which—

Figure 1:
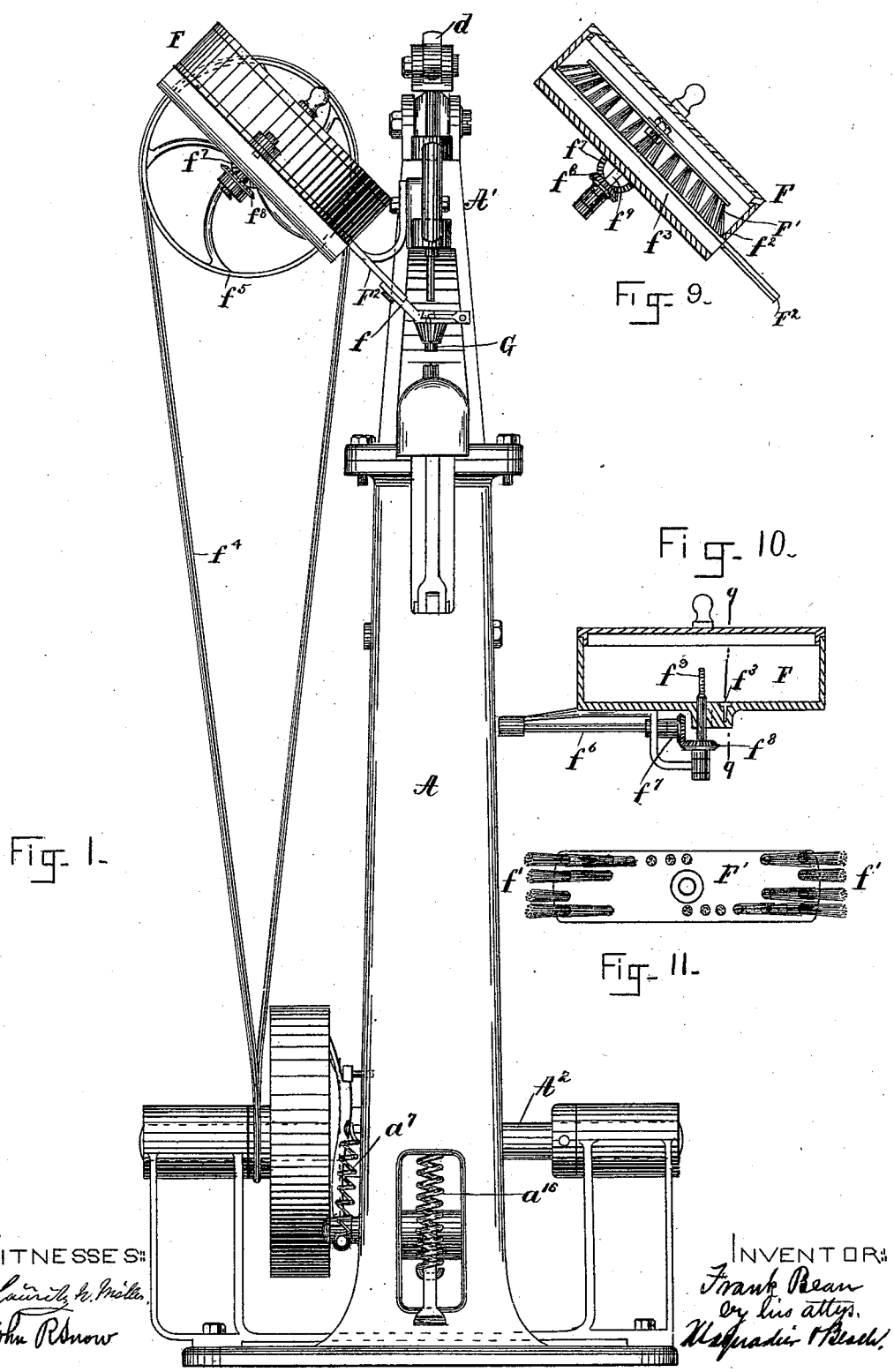
Figure 2:
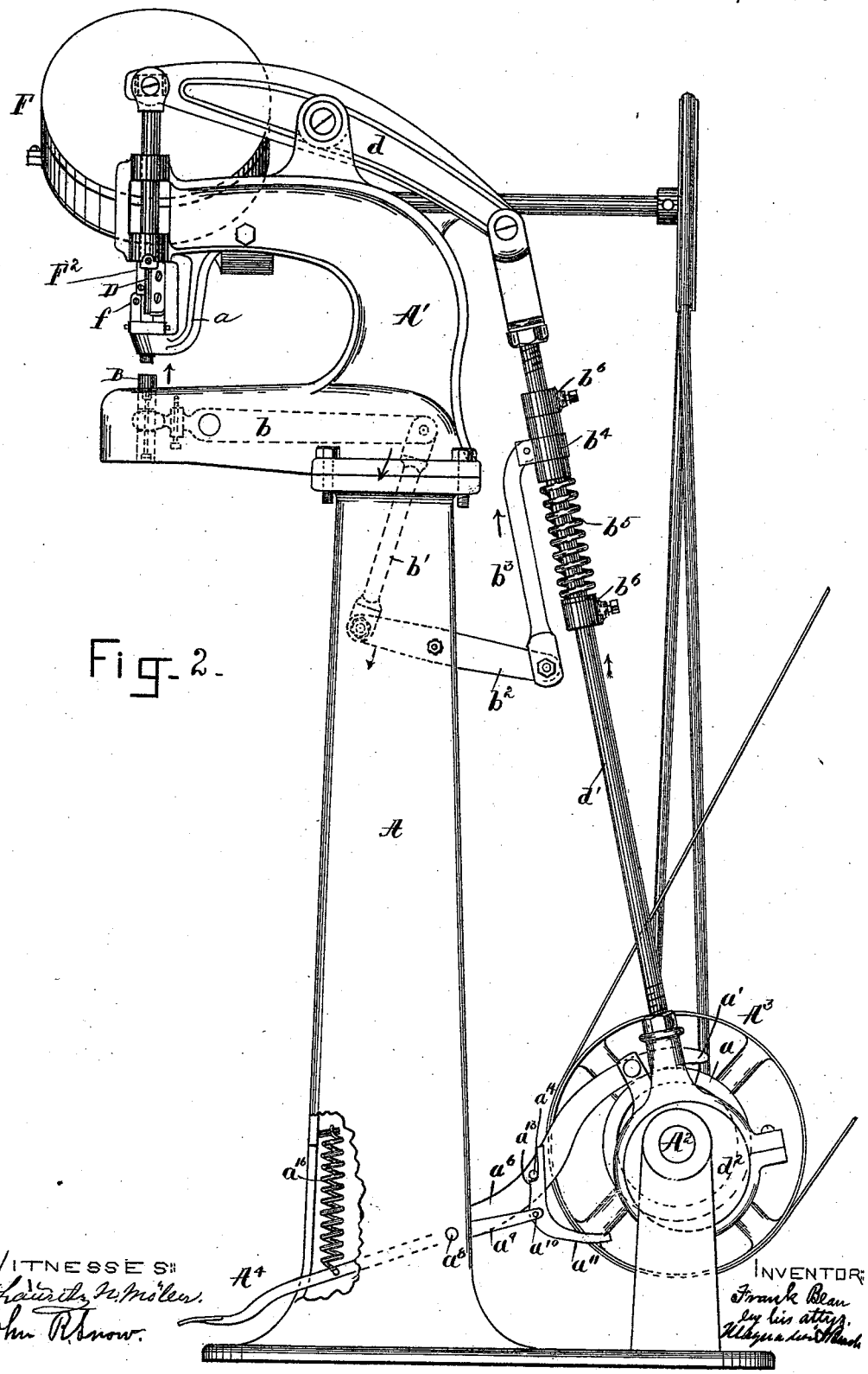
Figure 12:
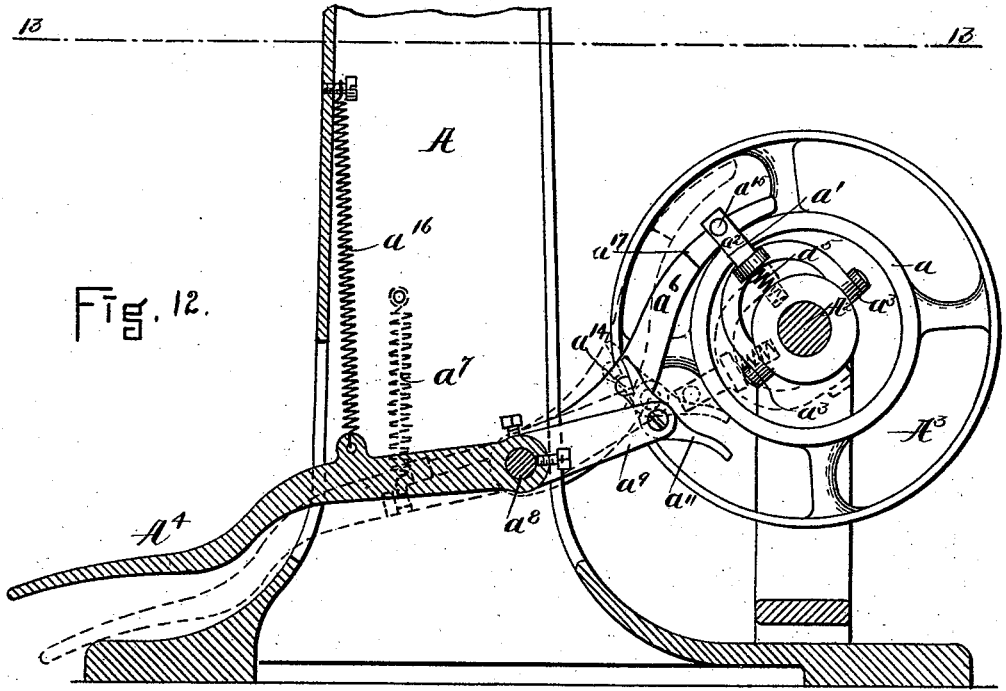
Figure 13:
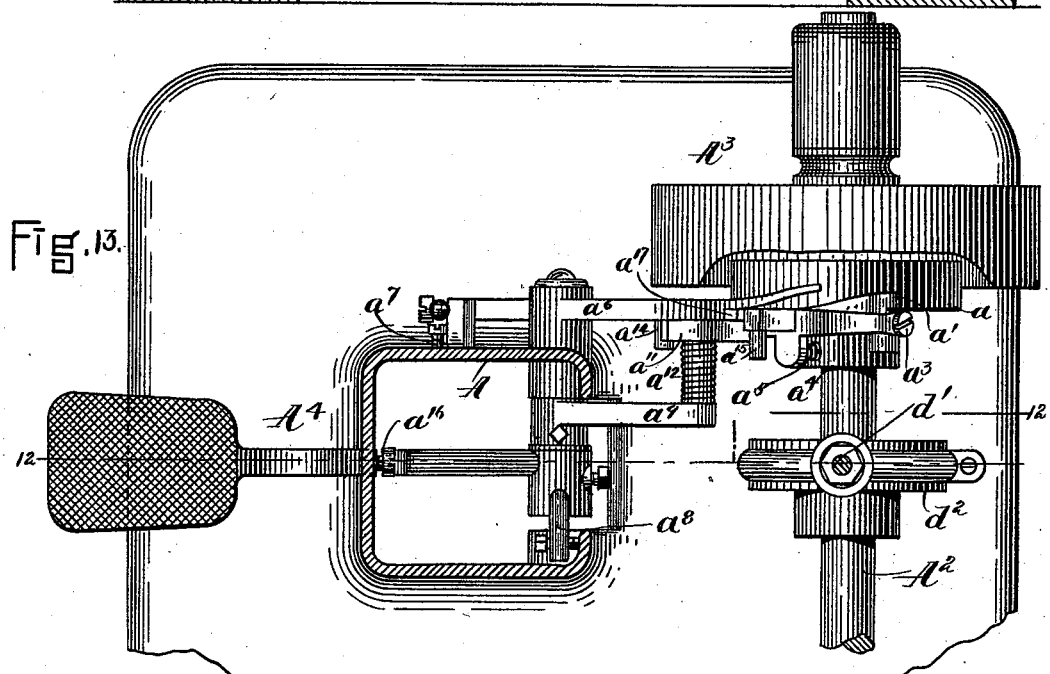

Figure 1 is a front view of a machine embodying my invention. Fig. 2 is a side elevation of the same; Fig. 3, a view partly in section showing the anvil and its actuating mechanism. Fig. 4 is a sectional view of the anvil and anvil lever, on line 4—4 of Fig. 3. Fig. 5 is a top view of the detachable throat, and a section of the race way showing the slide jaws ready to receive a fastening. Fig. 6 is a similar view, the jaws being in position given them by the descent of the driver. Fig. 7 is a side view of what is shown in Figs. 5 and 6. Fig. 8 is a sectional view on line 8—8 of Fig. 5. Fig. 9 is a view showing the hopper in section the brush therein and mechanism for rotating the brush, this section being taken at line 9—9 of Fig. 10. (See line 9 of Fig. 2.) Fig. 10 is a sectional view at line 10—10 of Figs. 1 and 2, the brush being removed. Fig. 11 is a bottom plan of my new brush forming part of my invention. Fig. 12 is a view partly in section illustrating the preferred means for securing the driver in a raised position; this view being on line 12—12 of Fig. 13. Fig. 13 is a view partly in section on line 13—13 of Figs. 12 and 2. Fig. 14 is a detail showing the fastening pusher above the heads of the fastenings in the raceway; and the driver raised. Fig. 15 is a similar view showing the pusher in contact with the head, a fastening and the driver in the throat.

The object of my invention is to produce an improved machine for driving and setting metallic fastenings, especially the staple-like fastening described in my Patent No. 365,898, dated July 5, 1887.

The main feature of my invention is the combination with a driver of means for automatically securing the driver in a raised position, after it has driven a fastening, whereby the driving of one fastening on top of one already driven, is prevented.

Other features of my invention are pointed out and claimed hereinafter.

In the drawings, A is a standard; and A' a head in which anvil B and driver D are mounted.

F is a reservoir for the fastenings; F', a brush; F$^2$ the raceway and G the detachable, throat which is mounted in a bracket $a$ and secured to the chute F$^2$. Driver D is reciprocated, through its connection with driving-shaft A$^2$, toward and away from anvil B.

In order to prevent the driver from descending before the anvil (which in this form of my machine also serves as a presser-foot) moves to release the work and the operator has time to feed his work, that is to prevent the driving of a fastening in the wrong place and especially to prevent the driving of one fastening against the head of one already driven (to the injury of the machine as well as the work) I combine with the driver and anvil some suitable mechanism for automatically locking the driver after it rises from the anvil, thereby preventing it from descending until the anvil has released the work and the operator intentionally causes the driver to descend. This combination is a radical novelty with me and while I have, as a mechanic, contemplated several devices for use in this combination, I prefer, on the whole, to employ in the combination the clutch illustrated in my drawings, though forming no part of my invention, being the invention set forth in Charles S. Craig's application, Serial No. 348,140, of even date herewith, on which Letters Patent of the United States No. 448,578 were granted March 17, 1891.

Driver D is connected to a lever $d$ which is connected with eccentric rod $d'$ engaging eccentric $d^2$ on driving shaft A$^2$, the driving-pulley A$^3$ of which has an annular flange $a$ notched at $a'$ to receive a lever $a^2$ loosely jointed at $a^3$ to a sleeve $a^4$ fast on shaft A$^2$. Lever $a^2$ is backed up by a spring $a^5$ which tends to keep the driving pulley A$^3$, which is loosely mounted on shaft A$^2$, clutched to the driving shaft so that the driving-pulley and driving shaft will rotate together. Lever $a^2$ is kept normally out of engagement with flange $a$, however, by a lever $a^6$ which is kept in position to engage lever $a^2$ and keep it out of engagement with tooth or notch $a'$ by a spring $a^7$. Lever $a^6$ is conveniently connected to treadle $A^4$ through the rocker shaft $a^8$ on which treadle $A^4$ is fast, arm $a^9$ having a sidewise projection $a^{10}$ carrying a lever $a^{11}$ controlled by a spring $a^{12}$. Lever $a^{11}$ has a tooth $a^{13}$ and the tension of spring $a^{12}$ tends to keep tooth $a^{13}$ in engagement with projection $a^{14}$ on lever $a^6$. Lever $a^2$ has a projection $a^{15}$ of sufficient length to engage the free end of lever $a^{11}$ as the driving-shaft $A^2$ rotates. Treadle $A^4$ is held in its highest position by a spring $a^{16}$ and as the treadle $A^4$ and arm $a^9$ are both fast on rocker-shaft $a^8$, detent $a^{11}$ is kept normally in the position shown in full lines in Fig 12, (see also Fig. 13) and the eccentric $d^2$ on shaft $A^2$ is in position to keep the driver raised as shown in Fig. 2. Spring $a^7$ also keeps lever $a^6$ in the position shown best in Figs. 2 and 13 and in full lines in Fig. 12, that is, in position to keep lever $a^2$ pressed back against the force of the spring $a^5$, and out of the path of the notch or tooth $a'$ on flange $a$ of driving-pulley $A^3$. Consequently rotation of the driving-pulley at this time will have no effect on the driver which is thus locked in a raised position. By depressing treadle $A^4$, which, of course, may be a handle lever $a^6$ is carried out of engagement with lever $a^2$ (see dotted lines in Fig. 12) and lever $a^2$ is forced toward flange $a$ by the expansion of its spring $a^5$. Rotation of pulley $A^3$ brings notch or tooth $a'$ into engagement with lever $a^2$ and the pulley is coupled to the shaft $A^3$ and the driver caused to descend. As the lever $a^2$ rotates, its projection $a^{15}$ engages the free end of lever $a^{11}$ which is thereby rocked against the force of its spring $a^{12}$ out of engagement with lever $a^6$, so that the latter is snapped into its normal position. As shaft $A^3$ nears the end of its rotation, lever $a^2$ is brought into engagement with the free end of lever $a^6$, strikes the projection $a^{17}$ and is thus not only arrested in its rotation but also carried away from and out of engagement with notch or tooth $a'$ on flange $a$, allowing pulley $A^3$ to run loose again and locking the driver in its raised position. The pulley $A^3$ remains thus uncoupled and the driver consequently locked in its raised position until the operator again depresses the treadle. This combination is of the greatest importance where inexperienced or careless operators are employed as it is impossible to drive a fastening without a physical effort of the operator. When machines are purely automatic, operators frequently do a great deal of harm to the machines and work by allowing a fastening to be driven on top of another fastening or before the work is fed along the proper distance.

Anvil B is conveniently mounted on a block supported by a lever $b$ and is held in the block by a screw $b^8$. By this construction which is a feature of my invention the anvils can be readily changed and this is important as anvils of varying configuration of face are required. The anvil serves as a presser foot as well as an anvil and reciprocates toward and away from the throat G clamping the work against it while the fastening is driven and moving back to release the work after the fastening is driven. The anvil is actuated through a lever $b$, connecting rod $b'$, lever $b^2$, and connecting rod $b^3$ and eccentric rod $d'$ from the eccentric $d^2$ on shaft $A^2$. When the eccentric rod $d'$ moves to cause the driver to descend, it carries the rod $b^3$ along with it thus causing anvil B to rise toward throat G, through rod $b^3$, lever $b^2$, rod $b'$ and lever $b$.

To adapt the machine for work varying in thickness, I secure rod $b^3$ to a loose collar $b^4$ on eccentric rod $d'$, this collar $b^4$ being backed up by a spring $b^5$. Spring $b^5$ and collar $b^4$ are conveniently secured on rod $d'$ by adjustable collars $b^6$. It will now be plain that when anvil B brings the work against throat G, spring $b^5$ yields and the machine adapts itself to work varying in thickness. This combination of the anvil and a driving-shaft by means of a yielding connection is a radical novelty with me and an important feature of my invention.

Another feature of my invention is the combination of the throat and race-way with jaws which arrest the fastening when it has descended over the throat in line with the driver. The best embodiment of this feature of my invention now known to me is that shown, the lower end of the race-way $F^2$ having a transverse dove-tail groove $g$ in which are mounted slides $g'$ backed up by springs $g^2$. Two slides $g'$ are preferable although I find that one will answer very well (see Fig. 14) and that both in some cases may be dispensed with, if desired, as explained in my application, Serial No. 348,258 of even date herewith. For the best results, however, I consider it desirable to employ two slides $g'$ each of which has a recess $g^3$ in its inner end. The slides $g'$ are held normally with their inner ends slightly separated as shown in Fig. 5, to allow the prongs of the fastenings in the race-way to pass into the space formed by the recesses $g^3$ over the throat G and in line with driver D. Slides $g$ are limited in their inward movement by any suitable stops, say $g^4$ $g^5$. When a fastening is driven the driver forces slides $g'$ apart and into the position shown in Fig. 6 against the force of springs $g^2$. It will be seen that by leaving a space normally between the inner ends of slides $g'$, the fastening in the race way, next above the one between the slides, slides between the jaws as soon as the driver has risen a sufficient distance; but while the driver is between the slides, no fastening can slide into the throat. Owing to the fact that fastenings have bodies or prongs of different lengths I form the upper end of the throat, with a slot $g^6$ in line with the raceway $F^2$, to allow the largest bodies or prongs to enter the throat. This is also a feature of my invention.

To adapt the machines for driving fastenings of various sizes in cross-section, I make the throat G removable, and I am the first, so far as I know, to make a setting machine with a removable throat and this is an important feature of my invention. To carry out this feature of my invention, I combine the throat G with means for holding it in its support, the best means now known to me being the section $f$ of race way $F^2$. Throat G is rigidly secured to section $f$ which is fastened after the throat is placed in its socket, to the main section of the raceway as plainly shown in the drawings, that part $F^2$ of the whole raceway being the main raceway and raceway section $f$ forming a supplementary raceway. Throat G is thus kept from vertical as well as rotary movement. It will be seen that one throat may be quickly removed and another put in its place and by varying the diameters of the throats, any size fastening can be driven in the machine.

Hitherto, in machines of this class, much difficulty has been experienced in getting a constant supply of fastenings from the reservoir, the fastenings frequently clogging or failing to drop into the race way. I have discovered, however, that by using a brush $F'$ of novel construction, the fastenings are moved in such wise in the reservoir that clogging is prevented and a constant supply of fastenings in the raceway insured. This novelty of construction of the brush consists in mounting the end line of bristles at such an angle to the back that they work in the corner $f^2$ formed by the bottom and side walls of the reservoir whereby the outlet is constantly swept by the brush and fastenings prevented from lodging there, as will be plain to all skilled in the art. (See Fig. 9.) Reservoir $F'$ has the usual inclined bottom and groove running into race-way $F^2$ and the fastenings descend by gravity and jarring of the machine. Brush $F'$ is conveniently rotated by means of a belt $f^4$ from the driving shaft $A^3$ over pulley $f^5$ on shaft $f^6$ carrying a gear $f^7$ which meshes with gear $f^8$ on the spindle $f^9$ of brush $F'$. The belt $f^4$ passes over a pulley $f^{10}$ which rotates with the driving-shaft and consequently the brush is always in motion when the driving shaft is in motion. This constant movement of the brush is very desirable in order to get a full supply of fastenings in the raceway.

A feature of my invention not hereinbefore described is an attachment illustrated in Figs. 14 and 15 and consists in the combination of the chute $F^2$ with a pusher $p$ preferably connected to the driver and operated thereby. When the driver descends the pusher engages the head of a fastening in the chute and pushes it toward the throat. This attachment is not shown in the other figures of my drawings because it may be dispensed with, if desired.

It is readily connected or disconnected, as will be plain to all skilled in the art, and when used more perfectly insures the descent of the fastenings to the throat. Pusher $p$ is provided with a spring $p'$ and recessed at that end $p^2$ nearest the chute so as to receive more or less of the head of the fastening. The spring $p'$ tends to keep the pusher away from the driver and throat and against the stop $p^3$. Pusher $p$ is loosely pinned to its support $p^4$ mounted on the driver-bar and adjustable thereon by means of a screw $p^5$. As it is oftentimes necessary to make a fine adjustment of the pusher so as to prevent it from bruising or scratching the head of a fastening, the support $p^4$ is provided with a set screw $p^6$ forming with the upper wall $p^7$ of the opening $p^{7*}$, in which the support $p^4$ moves, an auxiliary adjustable stop. The pusher is fulcrumed at $p^8$ and an adjustment is here provided for varying the motion of the pusher, by forming the pusher with an extra fulcrumed receiving hole $p^9$. It is also sometimes desirable to vary the tension on spring $p'$ (to suit varying speeds at which the machine is run, &c.) and the pusher is accordingly provided at several places with holes $p^{10}$ by which the spring $p'$ may be attached to the pusher.

The operation of the machine will be fully understood by those skilled in the art from the foregoing description.

What I claim is—

1. In a setting machine, the combination of a throat, an anvil automatically reciprocated toward and away from the throat to clamp the work, a driving shaft, and a yielding connection,—rod $d'$, spring $b^5$, levers $b^3$, $b^2$, $b'$ and $b$,—between the shaft and anvil, substantially as and for the purpose set forth.

2. In a setting machine, the combination of a main raceway, a throat support having a hole to receive the throat, and the throat formed with a supplementary raceway at an angle to the throat, the throat being removable from the hole in the support and the supplementary raceway being secured to the main raceway, all substantially as and for the purpose set forth.

3. In a setting machine, the combination with a race-way, of throat G, one or more slides $g'$, springs $g^2$ and stops $g^4$ $g^5$, each slide being mounted at the raceway end of the throat and moving away from the fastening passage against the force of a spring $g^2$, and being limited in its movement toward the fastening passage by a stop $g^4$ $g^5$, and recessed on that edge toward said passage, substantially as and for the purpose set forth.

4. In a setting machine, the combination of driver D and chute $F^2$ with pusher $p$, and spring $p'$, the pusher being carried by the driver, moving therewith and also toward and away from the driver, substantially as and for the purpose set forth.

5. In a setting machine, the combination of a driver and raceway with a swinging pusher $p$, spring $p'$ and stop $p^3$, the spring moving the pusher in one direction and the stop limiting the movement of the pusher in that direction, all substantially as and for the purpose set forth.

6. In a setting machine, the combination of driver D with the adjustable pusher support $p^4$ and pusher $p$ and auxiliary stop $p^6$, stop $p^6$ being adjustable for the nicer adjustment of the pusher in relation to the raceway, all substantially as and for the purpose set forth.

7. In a setting machine, the combination of a pusher support ($p^4$), pusher $p$ loosely pinned thereto, and spring $p'$; the pusher and spring being adapted for connection at several places, as at holes $p^{10}$, substantially as and for the purpose set forth.

8. In a setting machine, the combination of an anvil B lever $b$, supporting the anvil and moving it toward and away from the throat, connecting rod $b'$, lever $b^2$, connecting rod $b^3$, spring $b^5$ and rod $d'$, spring $b^5$ forming a yielding connection between the anvil and rod $d'$, all arranged and operating substantially as and for the purpose set forth.

FRANK BEAN.

Witnesses:
 FRANK D. MARCH,
 EDWARD S. BEACH.